No. 611,849. Patented Oct. 4, 1898.
H. J. SONDER.
TUFTING MACHINE.
(Application filed Sept. 24, 1897.)
(No Model.) 6 Sheets—Sheet 1.
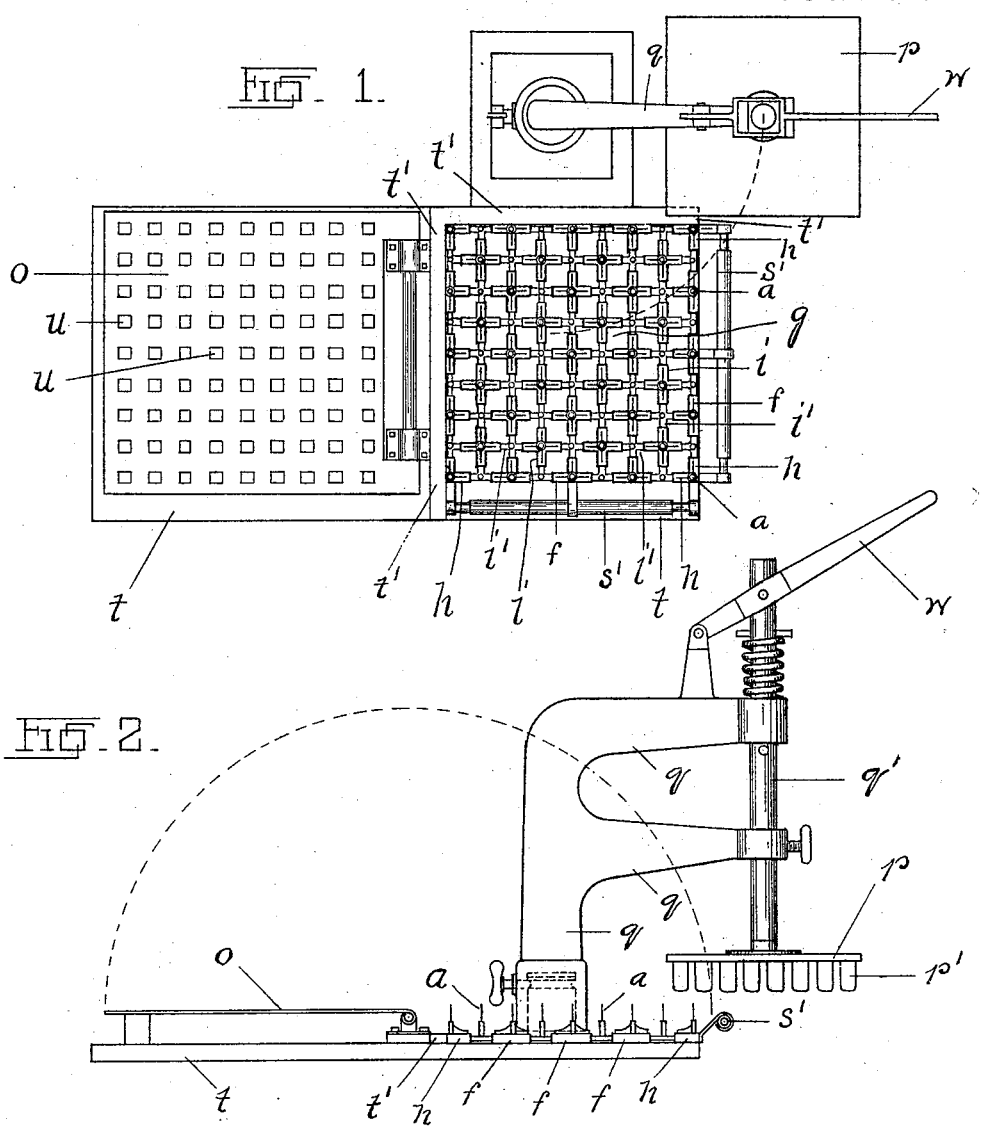
Witnesses
Henry Peters.
Frank Hausfeld
Inventor
Herman J. Sonder.
By Frank H. Deane Atty.

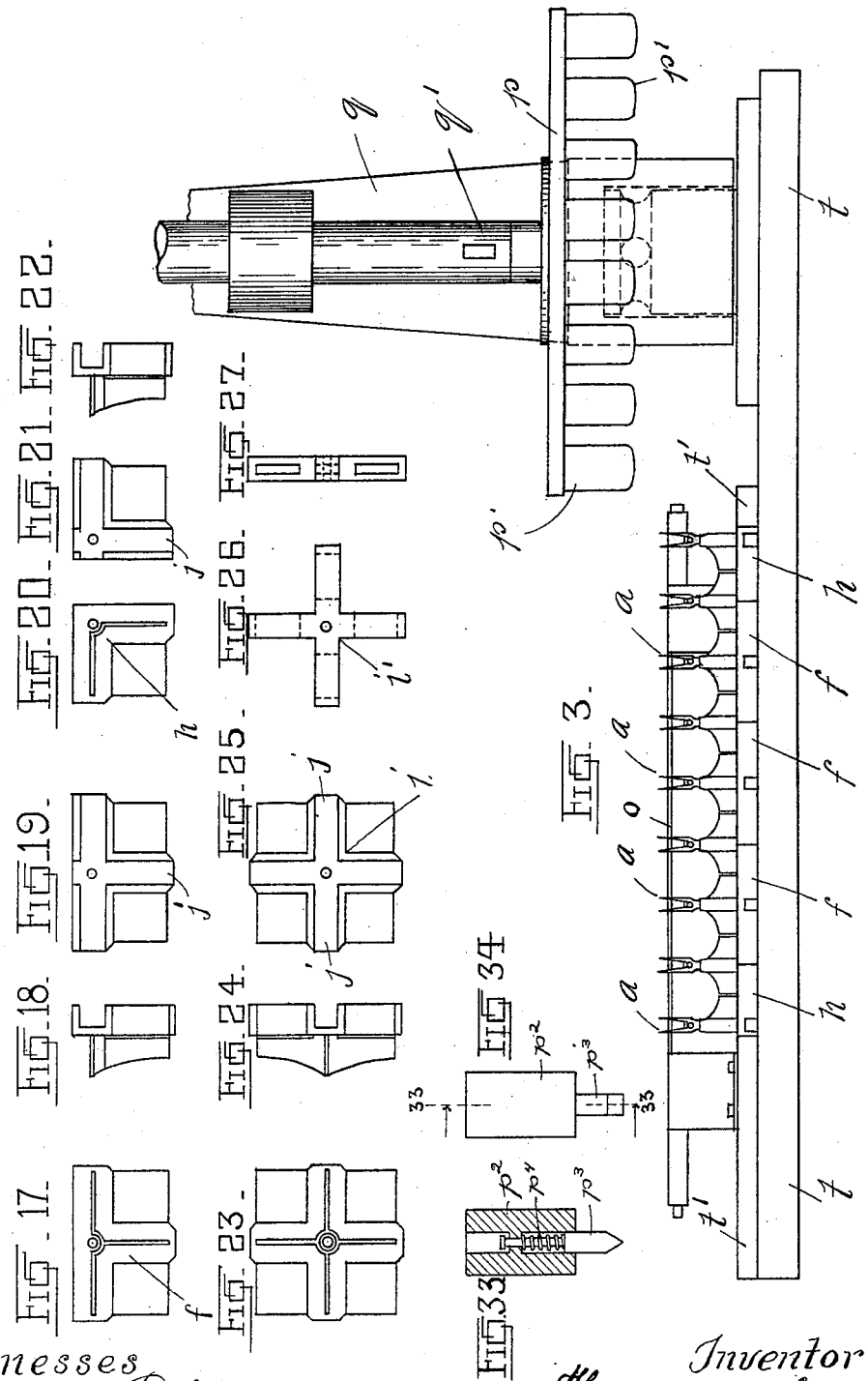

No. 611,849. Patented Oct. 4, 1898.
H. J. SONDER.
TUFTING MACHINE.
(Application filed Sept. 24, 1897.)
(No Model.) 6 Sheets—Sheet 3.
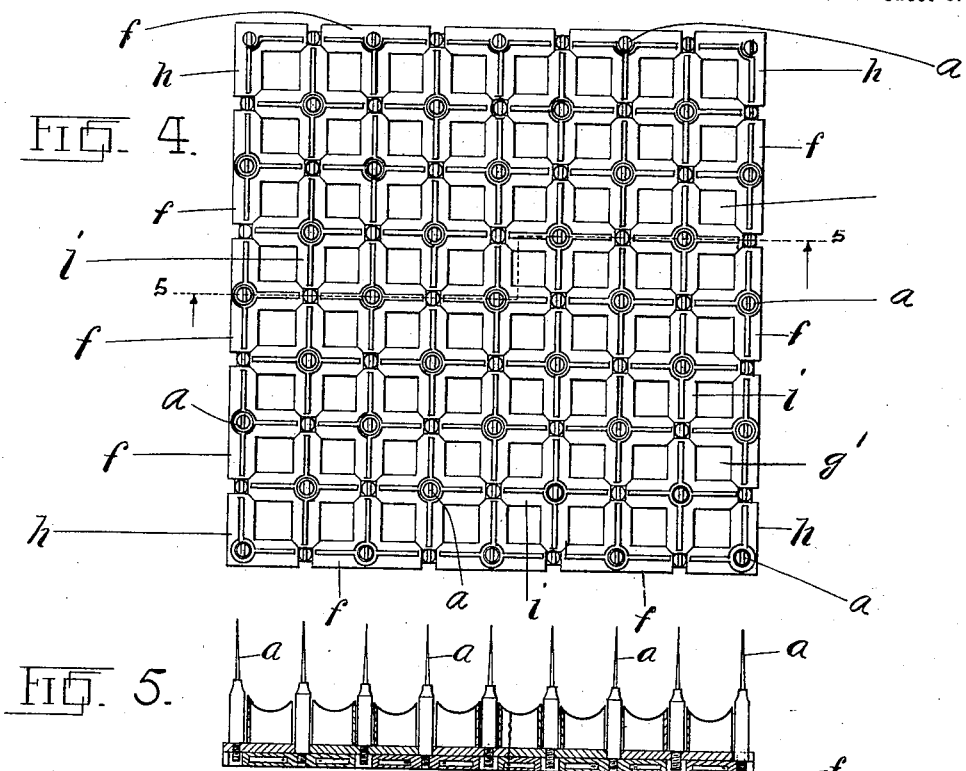
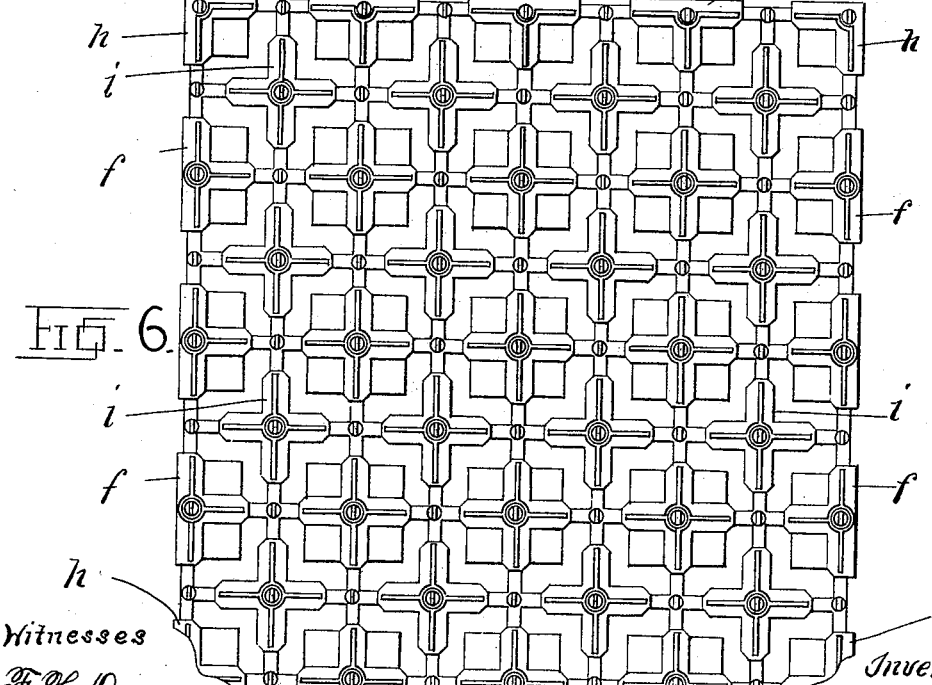
Witnesses
F. H. Deane
Henry Peters.
Inventor
Herman J. Sonder.
THE NORRIS PETERS CO., PHOTO-LITHO., WASHINGTON, D. C.

No. 611,849. Patented Oct. 4, 1898.
H. J. SONDER.
TUFTING MACHINE.
(Application filed Sept. 24, 1897.)
(No Model.) 6 Sheets—Sheet 4.
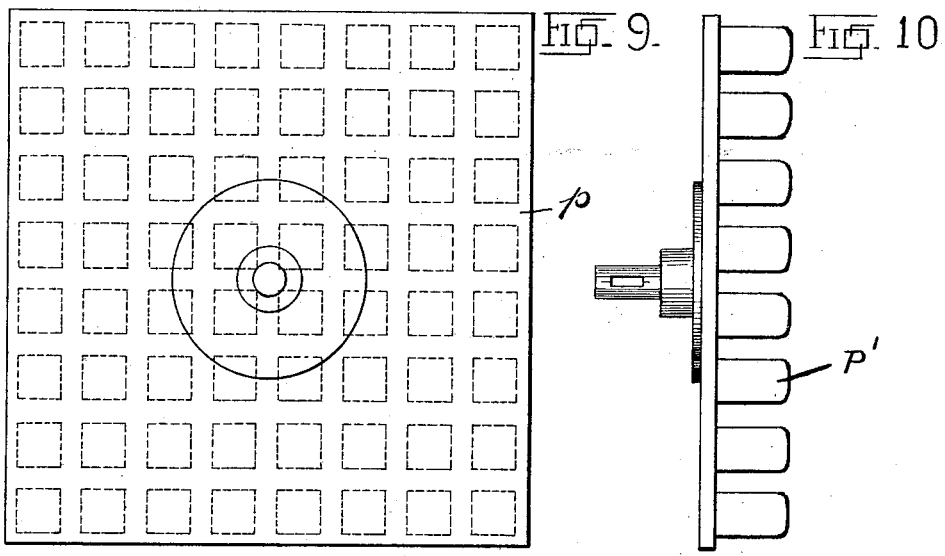
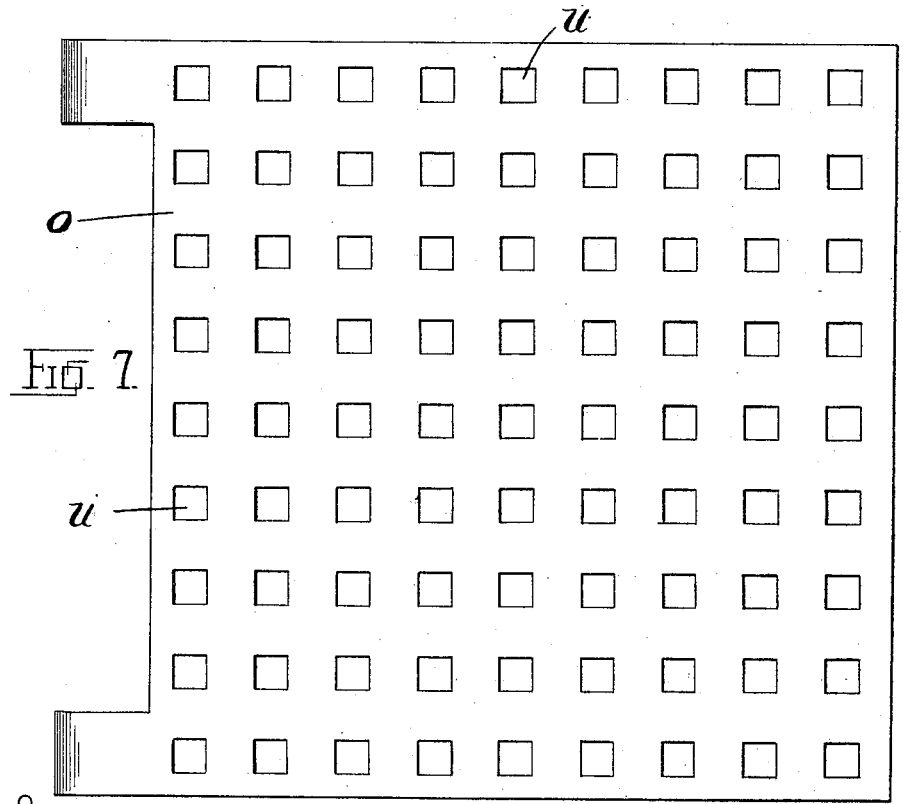
Witnesses
F. H. Deane
Henry Peters
Inventor
Herman J. Sonder
THE NORRIS PETERS CO., PHOTO-LITHO., WASHINGTON, D. C.

No. 611,849. Patented Oct. 4, 1898.
H. J. SONDER.
TUFTING MACHINE.
(Application filed Sept. 24, 1897.)
(No Model.) 6 Sheets—Sheet 5.
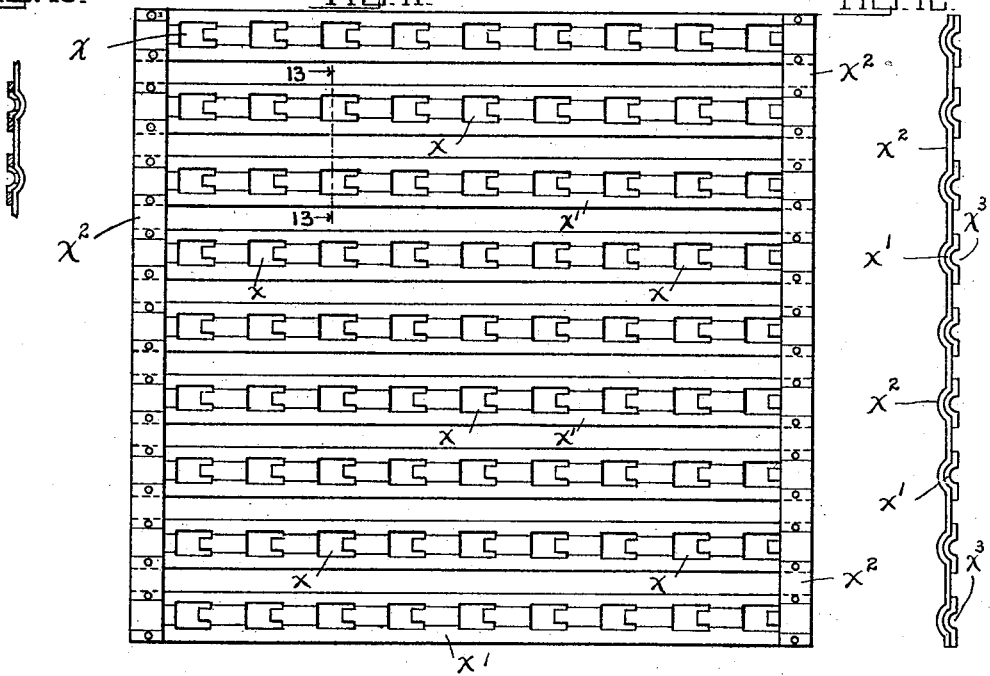
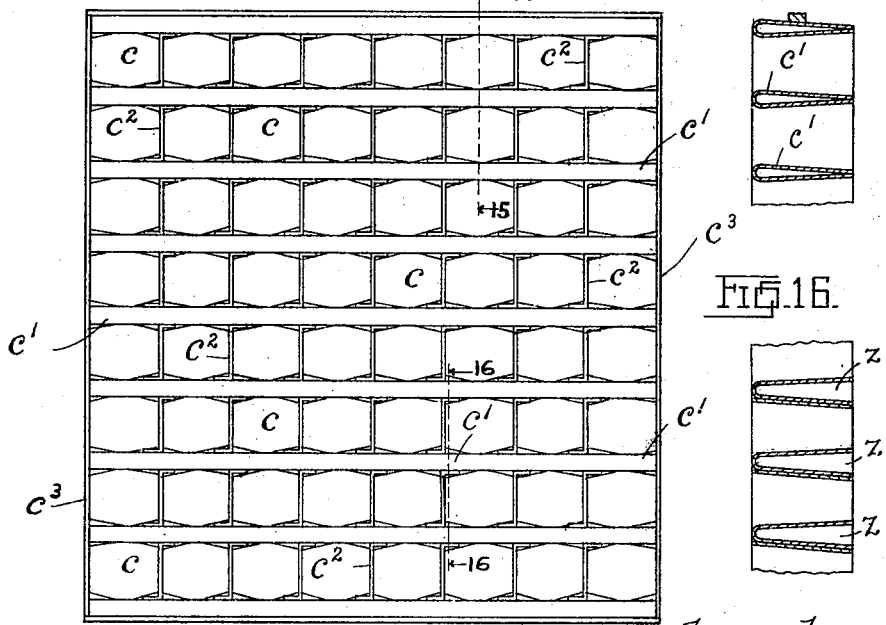
Witnesses
Henry Peters.
Frank Hausfeld.
Inventor
Herman J. Sonder,
By Frank H Deane Atty.

No. 611,849. Patented Oct. 4, 1898.
H. J. SONDER.
TUFTING MACHINE.
(Application filed Sept. 24, 1897.)
(No Model.) 6 Sheets—Sheet 6.
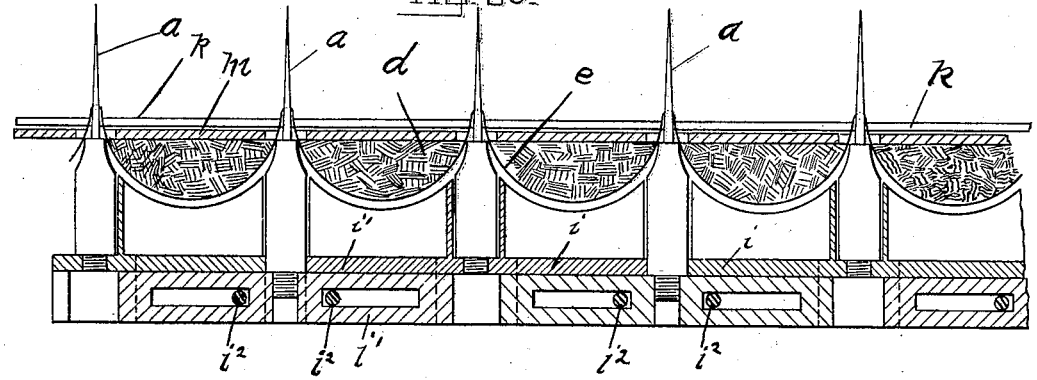
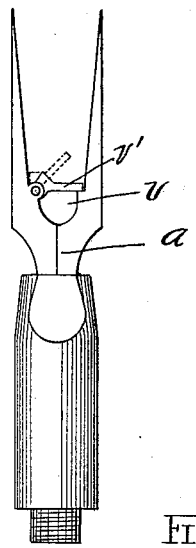
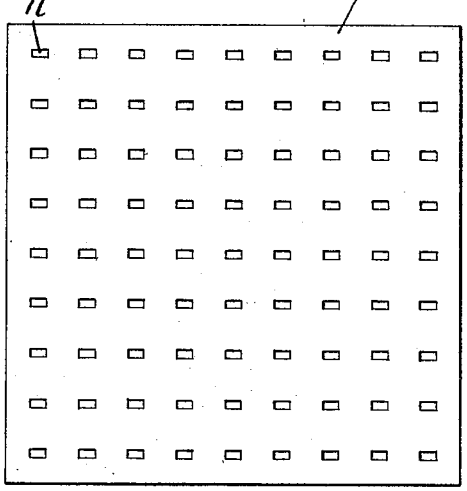
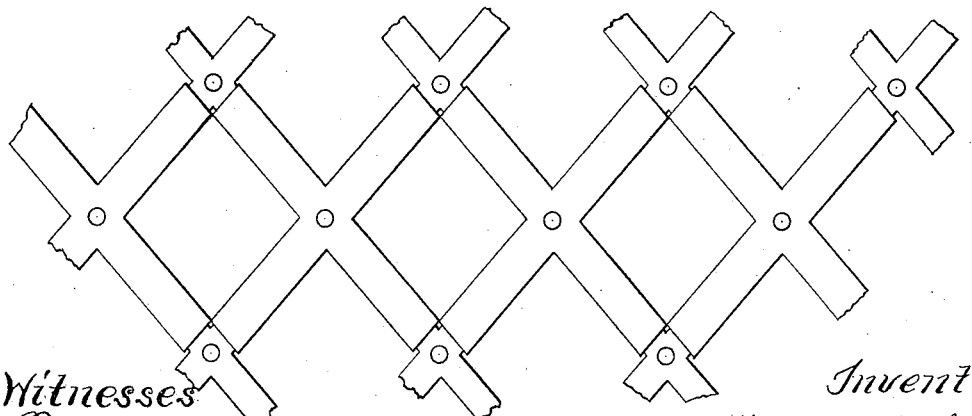
Witnesses
F. H. Deane
Henry Peters
Inventor
Herman J. Sonder

UNITED STATES PATENT OFFICE.

HERMAN J. SONDER, OF CHICAGO, ILLINOIS.

TUFTING-MACHINE.

SPECIFICATION forming part of Letters Patent No. 611,849, dated October 4, 1898.

Application filed September 24, 1897. Serial No. 652,924. (No model.)

*To all whom it may concern:*

Be it known that I, HERMAN J. SONDER, a citizen of the United States, residing at Chicago, in the county of Cook, State of Illinois, have invented a new and useful Tufting-Machine, of which the following is a true and exact specification, reference being had to the accompanying drawings, forming a part thereof.

This invention relates to improvements in tufting-machines, and has for its prime object the production of a machine of this class in which the several operations required to produce tufting for upholstered furniture are performed successively within a single machine, the materials remaining within the machine until the several operations have been performed. This object is attained by the devices illustrated in the accompanying drawings, in which—

Figure 1 is a plan view of a tufting-machine embodied in my invention, and Fig. 2 is a side elevation of the same with one of the handles removed. Fig. 3 is an end elevation of a part of the same machine drawn to a larger scale and having both handles s' removed. Fig. 4 is a plan view of the work-table of the machine as it appears when contracted to its smallest dimensions. Fig. 5 is a sectional elevation taken on line 5 5 of Fig. 4. Fig. 6 is a plan view of work-table of machine as it appears when expanded to its largest dimensions. Fig. 7 is a plan view of swinging leaf to which the facing goods is attached and which forces facing goods down over pins, and Fig. 8 is an edge view of the same. Fig. 9 is a plan view of the plunger which compresses the filling into the sags of the cloth covering or other facing goods. Fig. 10 is a side elevation of the same. Fig. 11 is a plan view of the wire guide-plate which is placed over pins of work-table to guide fastening-wires through eyes of pins. Fig. 12 is an end view of the same, and Fig. 13 is a section taken on line 13 13 of Fig. 11 and looking in the direction indicated by the arrows. Fig. 14 is a plan view of the filler which is placed over the pins of the work-table for feeding the filling down into the sags of the facing goods. Fig. 15 is a vertical section taken on line 15 15 of Fig. 14, and Fig. 16 is a section taken on line 16 16 of Fig. 14, looking in the direction indicated by the arrows. Fig. 17 represents a top view of one of the side pieces of the work-table, Fig. 18 an edge view, and Fig. 19 a bottom view, of the same. Fig. 20 represents a top view of one of the corner-pieces of the work-table, Fig. 21 a bottom view, and Fig. 22 an edge view, of the same. Fig. 23 represents a top view of one of the cross-pieces of the work-table, Fig. 24 an edge view, and Fig. 25 a bottom view, of the same. Fig. 26 represents a plan view of one of the telescoping crosses by which the work-table is held together, and Fig. 27 is an edge view of the same. Fig. 28 represents a sectional elevation through a part of work-table of machine, showing a section of upholstery-work. Fig. 29 is a side view of one of the pins which are used when upholstery-work is fastened together with fastening-wires, and Fig. 30 is a side view of one of the pins which are used when upholstery-work is fastened together with buttons. Fig. 31 is a view of the pasteboard backing to which the under side of the upholstery-work is fastened through the holes shown. Fig. 32 represents a part of a work-table made in the form of diamonds to be substituted for work-table made in the form of squares, as shown in Figs. 4 and 6, when it is desired to have the upholstery-work of this pattern. Fig. 33 represents a sectional elevation of plunger-die which is used to open the prongs of the buttons when the button fastening is substituted for the wire fastening. Fig. 34 is an outside view of the same.

Similar letters of reference indicate the same parts in the several figures of the drawings.

To facilitate the understanding of the construction and general arrangement of my tufting-machine, I will first describe the general construction thereof.

The tufting-machine comprises a bed-plate upon which are mounted a work-table, a swinging frame, and a swinging leaf, and has a filler and a wire guide-plate as attachments.

Referring now by letters to the accompanying drawings, the bed-plate is made of wood or cast-iron and preferably of the shape shown in Figs. 1 and 2. In the drawings it is designated by the letter *t*.

Upon one part of the bed-plate is mounted the stand which carries the swinging frame *q*, upon another part is placed the work-table $g$, and another part serves as a rest for the swinging leaf $o$ when swinging leaf is not in use upon the work-table $g$.

The bed-plate is not made in one plane surface, but has two raised portions $t'$, Figs. 1, 2, and 3, one opposite to each pair of handles $s'$ of the work-table. The object of the two raised portions is to serve as a guide to the work-table $g$ while the same is being expanded or contracted. The work-table is that portion of the machine upon which the several operations which the machine performs are accomplished. It is made up of a number of parts, all of which are of metal.

In Fig. 1, $g$ indicates the entire work-table.

The work-table is shown separately in Figs. 4, 5, and 6, in which $h$ represents the corner-pieces; $f$, the side pieces; $i$, the cross-pieces, and $a$ the pins.

A corner-piece $h$ is shown separately in Figs. 20, 21, and 22, a side piece $f$ is shown separately in Figs. 17, 18, and 19, a cross-piece $i$ is shown separately in Figs. 23, 24, and 25, and a pin $a$ is shown separately in Fig. 29.

From the drawings the shape of the above-named parts will be clearly understood.

The corner-pieces $h$, the side pieces $f$, and the cross-pieces $i$ are locked together by the telescoping crosses $i'$, one of which is shown separately in Figs. 26 and 27. The telescoping crosses are made to slide within the grooves in the under side of the corner-pieces $h$, the side pieces $f$, and the cross-pieces $i$. The telescoping crosses have elongated holes or slots through which small fastening-pins $i^2$ pass, which also pass through the corner, side, and cross-pieces, and thus lock the entire work-table together, but permit of a slight movement in and out, expanding the entire work-table uniformly, longitudinally, and laterally.

The length of the slots in telescoping crosses determines the amount of movement of the work-table—that is, the amount that the work-table may be expanded.

The pins $a$ (shown separately in Fig. 29) are made of steel and are forked above the eye $v$. The lower end has a screw-thread which screws into the corner-pieces $h$, the side pieces $f$, the cross-pieces $i$, and the telescoping crosses of the work-table. At the upper part of the eye $v$ of the pin $a$, Fig. 29, there is hinged a small flap $v'$, the object of which is to prevent the facing goods from coming down too far over the pins, but which will freely lift to permit upholstery-work to be taken from machine.

Fixed to the work-table upon two sides thereof are the telescoping handles $s'$, Fig. 1, one handle being opposite the swinging leaf $o$. The other is opposite the swinging frame $q$. These handles are used to draw out or expand the work-table preparatory to operating the machine. The handles are made up of a tube and two pieces of brass or iron rod, each rod being fastened firmly at one end to a bracket which is bolted to the corner-pieces $h$ of the work-table. The length of these rods is made such that when the work-table is contracted to its smallest size the ends of the rods will almost, but not quite, meet. At a point midway between the corner-pieces $h$ of the work-table is another bracket similar to those which are bolted to the corner-pieces $h$, and this third bracket is bolted to one of the side pieces $f$ and carries the tube into which the rods slide as the work-table is contracted.

The swinging frame $q$ is that part of the machine which carries the plunger-plate $p$, the plungers $p'$, the plunger-rod $q'$, and the hand-lever $w$. These parts are brought into action when the hair filling is to be compressed into the sags of the facing goods. Also while the filler (shown in Figs. 14, 15, and 16) is being lifted from the machine the plungers $p'$ are brought down upon the hair filling and hold it in position.

The swinging frame is supported at its lower end in a stand or step which is bolted to the bed-plate $t$, Figs. 1, 2, and 3. When in use, these parts are swung into a position vertically over the work-table, and when not in use they are swung back, as shown in Fig. 1.

The swinging frame $q$ is made of cast-iron, preferably in the form shown in Figs. 1 and 2, having two arms each of which terminates in an eye to form a guide for the plunger-rod $q'$. The plunger-rod $q'$ carries at its lower end a plunger-plate $p$, to which are attached plungers $p'$. These plungers compress the hair filling into the sags of the facing goods. There is one plunger $p'$ for each set of four pins of the work-table.

The plunger-rod $q'$ is held up when not in use by a spring the lower end of which rests upon the upper arm of the swinging frame $q$ and the upper end supports the pin or cotter, which passes through the plunger-rod.

The hand-lever $w$ is used to bring the plunger-rod, plunger-plate, and plungers down.

The swinging leaf $o$, Figs. 1, 2, 7, and 8, is made of sheet metal and is hinged to the bed-plate. It has perforations $u$, which are spaced so that when it is swung over onto the work-table the perforations pass over the pins $a$ when the work-table is expanded to its largest dimensions.

The filler shown in Figs. 14, 15, and 16 is one of the attachments of the machine. It is made of tin or other sheet metal and generally of the form illustrated in the drawings. It is generally made as long and as wide as the contracted length and width of the work-table and is divided into a number of compartments $c$, which may be square or diamond-shaped and of a size to correspond with the shape and size of the areas between each set of four pins of the work-table. The compartments $c$ are formed by the longitudinal partitions $c'$, which run the entire length, and the lateral partitions $c^2$, which span the space between longitudinal partitions and which are bent over to form a surface to rivet or solder to longitudinal partitions. The longitudinal partitions $c'$ are made by folding a sheet of metal over in the form of the letter U, inverted, the ends of the sheet being jammed together at points midway between the corners of compartments $c$; but at the corners of compartments $c$ the two thicknesses of metal are separated and form housings $z$. These housings cover the pins of the work-table when the filler is placed upon the machine, and while serving as a guide to place the filler in the proper position they are also to prevent the hands of the operator from being injured by the sharp pins.

Fig. 15 is a vertical section taken at a point midway between two lateral partitions and shows the two thicknesses of metal brought together, and Fig. 16 is a vertical section taken close to one of the lateral partitions and shows the housings $z$. The depth of the filler is made such that the compartments $c$ will hold enough hair filling to fill out the sags in the facing goods. The end pieces $c^3$ are of the same depth as the longitudinal and lateral partitions and are made long enough to reach from side to side and bind the entire framework together.

The wire guide-plate shown in Figs. 11, 12, and 13 is another attachment of the machine. It is made of brass or other sheet metal and generally comprises the two end strips $x^2$ and a number of bars $x'$, which are riveted, soldered, or bolted thereto. The bars $x'$ are so shaped as to form grooves $x^3$, which run the entire length thereof along the under side. The object of these grooves is to guide the fastening-wires through the eyes $v$ of the pins $a$ to engage the loops of the facing goods formed by its being hung upon the hinged flaps $v'$. The bars $x'$ have perforations $x$, which are so spaced along their length and the bars are so spaced apart as to have the perforations $x$ of the wire guide-plate exactly correspond with the distance apart of the pins $a$ of the work-table when the work-table is contracted to its smallest dimensions. The wire guide-plate could of course be made entirely of one piece of metal stamped out of the solid, or it could be cast; but I prefer to make it as described above.

The pasteboard backing $m$ (shown in Fig. 31) is the foundation upon which the upholstery-work is built. The perforations $n$ in the pasteboard backing are made before it is placed upon the work-table of the machine. Perforations $n$ pass over pins $a$ of the work-table.

Fig. 28 shows a section of the work-table of the machine with a section of completed upholstery-work thereon ready to be lifted therefrom. The heavy line $e$ represents the facing goods or covering of the upholstery-work. $d$ represents the hair filling, $m$ the pasteboard backing, and $k$ one of the fastening-wires which are run through the loops of the facing goods at each pin $a$ of the work-table and prevent the loops of the facing goods from pulling back through the perforations $n$ of the pasteboard backing. The ends of the fastening-wires are bent over to prevent their coming out.

Fig. 30 shows a design of pins which are used upon the work-table of the machine instead of that shown in detail in Fig. 29. This pin is used when the corners of the biscuits of the upholstery-work are to be fastened by buttons which have long prongs which pass through the upholstery-work and are then bent down to prevent their coming out. In these pins there are no prongs; but there are two hinged flaps which press against the button and hold it in place, but which freely swing up to permit button to be lifted from machine, as is done when upholstery-work is completed. The top of this pin is hollowed to receive face of button.

The plunger-dies, Figs. 33 and 34, are used upon the plunger-plate to open the prongs of the buttons when button fastening is substituted for wire fastening, as described above. The plunger-dies $p^2$ are made of iron and are bored out to receive the plungers $p^3$ and helical compression plunger-springs $p^4$. Plunger-dies are operated by the hand-lever $w$, plunger-rod $q'$, and plunger-plate $p$ in the same manner as are the plungers $p'$.

In Figs. 4, 5, and 6 the areas between each set of four pins $a$ are shown to be squares; but the work-table may be made in the form of diamonds, as shown in Fig. 32, which is a plan view of a part of a work-table.

Having described the construction of my tufting-machine, I will now proceed to describe the method of operating the same. The work-table $g$ of the tufting-machine is drawn out or expanded by means of the telescoping handles $s'$, which are attached thereto. Then the cloth or other material used for upholstering purposes is placed upon the hinged swinging leaf, and the swinging leaf is swung over so that the cloth is forced down over the pins $a$ of the work-table, and the swinging leaf $o$ is then swung back to its former position, the cloth remaining upon the work-table suspended on the flaps $v'$ of the pins $a$. The work-table is then contracted uniformly by the telescoping handles $s'$, and as the pins $a$ are brought more closely together, the cloth being held upon the pins, a sag is formed in the square or diamond-shaped area between each set of four pins. The filler (shown in Figs. 14, 15, and 16) is then placed upon the work-table $g$, so that the square or diamond-shaped areas $c$ of the filler come vertically above the square or diamond-shaped areas of the work-table, and pins $a$ of the work-table are covered by the housing $z$ of the filler. The hair or other filling is then fed into the sags of the cloth through the openings $c$ in the filler. The plungers $p$ are then brought down by means of the hand-lever $w$, which is pivoted to the swinging frame $q$, and is attached to the plunger-rod $q'$, upon the lower end of which is the plunger-plate $p$, to which are attached the plungers $p'$, thus compressing the hair or other filling into the sags of the cloth. In practice the plungers are made longer than the depth of the filler, so that the filler may be raised high enough to be freed from the filling while the filling is held in position by the plungers. After the filler has been raised the plungers are freed from the filling. The pasteboard backing $m$ (shown in Fig. 31) is then placed upon the work-table so that the openings $n$ pass over the pins $a$ of the work-table. Next the wire guide-plate (shown in Fig. 11) is placed upon the pasteboard backing $m$ so that the openings $x$ of the wire guide-plate pass over the pins $a$ of the work-table. The plungers $p'$ are now brought down and hold the wire guide-plate and pasteboard backing in position while the sharpened wires $k$, as shown in Fig. 28, are passed through the loops of the facing goods and the eyes $v$ of all the pins of the work-table, thus locking the cloth covering and the pasteboard backing together with the hair filling between. The plungers are then raised and the swinging frame is swung back. The completed tufting may now be lifted up vertically from the machine.

I am aware that prior to my invention tufting-machines have been made. I therefore do not claim such a combination, broadly; but What I do claim to be my invention, and desire to secure by Letters Patent, is—

1. The combination in a tufting-machine of the expanding and contracting work-table $g$, with a swinging leaf $o$, adapted to place upholstery goods upon the work-table in correct position, a swinging frame $q$, and plunger $p'$, to be operated by hand-lever $w$, plunger-rod $q'$, and plunger-plate $p$, all mounted upon a base-plate $t$, substantially as described.

2. In a device of the character described, a work-table composed of a number of telescopic sections, pins arranged on said sections, and telescoping handles secured to the side sections, as described.

3. In a device of the character described, a work-table formed of a number of grooved sections, cross-pieces having slotted arms fitting within the grooves of the sections, and pins in the sections sliding in the slots of the cross-pieces, as described.

4. In combination with a work-table having a number of projecting pins, a filler composed of a frame provided with longitudinal partitions, braced at intervals with transverse partitions, said longitudinal partitions being U-shaped in cross-section with their sides bent together between the transverse partitions, forming housings at the intersections of the partitions for the reception of the pins, substantially as described.

5. In a device of the character described, a work-table composed of sections, pins arranged thereon dividing the work-table into a number of spaces, said sections being movable to contract the work-table and diminish the sizes of the spaces, and plungers adapted to be forced within the spaces while the work-table is contracted, as and for the purpose described.

6. In a device of the character described, a bed-plate, a work-table mounted thereon and formed of sections, pins arranged on the sections dividing the work-table into a number of spaces, said sections being movable to contract the work-table and diminish the sizes of the spaces, a swinging leaf hinged to the bed-plate and having openings adapted to receive the pins when the work-table is in its normal condition, a frame mounted on the bed-plate to swing over the work-table, and plungers suspended from the frame and adapted to be forced within the spaces while the work-table is contracted, as and for the purpose described.

In testimony whereof I have signed this specification in the presence of two subscribing witnesses.

HERMAN J. SONDER.

Witnesses:
F. H. DEANE,
HENRY PETERS.